United States Patent
Tejani et al.

(10) Patent No.: US 9,569,184 B2
(45) Date of Patent: Feb. 14, 2017

(54) GENERATING NATIVE CODE FROM INTERMEDIATE LANGUAGE CODE FOR AN APPLICATION

(75) Inventors: Sameer Tejani, Newcastle, WA (US); Adina M. Trufinescu, Redmond, WA (US); Yasser Shaaban, Seattle, WA (US); Abolade Gbadegesin, Seattle, WA (US); Ashish Babbar, Bothell, WA (US); Mei-Chin Tsai, Bellevue, WA (US); Subramanian Ramaswamy, Redmond, WA (US); Casimir Lakshan Fernando, Renton, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 534 days.

(21) Appl. No.: 13/604,618

(22) Filed: Sep. 5, 2012

(65) Prior Publication Data

US 2014/0068583 A1 Mar. 6, 2014

(51) Int. Cl.
*G06F 9/45* (2006.01)
*G06F 9/445* (2006.01)

(52) U.S. Cl.
CPC . *G06F 8/40* (2013.01); *G06F 8/41* (2013.01); *G06F 8/447* (2013.01); *G06F 8/51* (2013.01); *G06F 8/61* (2013.01); *G06F 8/63* (2013.01); *G06F 8/54* (2013.01); *G06F 8/65* (2013.01)

(58) Field of Classification Search
None
See application file for complete search history.

(56) References Cited

U.S. PATENT DOCUMENTS

| | | | | |
|---|---|---|---|---|
| 5,812,854 | A * | 9/1998 | Steinmetz et al. | 717/159 |
| 6,484,313 | B1 * | 11/2002 | Trowbridge et al. | 717/146 |
| 7,730,465 | B2 | 6/2010 | Sutter et al. | |
| 7,900,199 | B2 * | 3/2011 | Gassoway | 717/164 |

(Continued)

FOREIGN PATENT DOCUMENTS

| | | |
|---|---|---|
| EP | 0510616 | 10/1992 |
| EP | 2405352 | 1/2012 |
| GB | 2467495 | 8/2010 |

OTHER PUBLICATIONS

Hong et al, "Java Client Ahead-of-Time Compiler for Embedded Systems" 2007, ACM.*

(Continued)

*Primary Examiner* — Lewis A Bullock, Jr.
*Assistant Examiner* — Mark Gooray
(74) *Attorney, Agent, or Firm* — Qudus Olaniran; Judy Yee; Micky Minhas

(57) ABSTRACT

Disclosed herein are representative embodiments of tools and techniques for installing, executing, and/or updating managed applications through generation of native code from code in an intermediate language. According to one exemplary technique, a computing device receives machine dependent intermediate language code (MDIL code) generated by an online provider for an application. Additionally, the computing device installs the application on the computing device by generating a native image for the application, which includes binding a portion of the MDIL code with one or more libraries on the computing device. Also, the native image is stored on the computing device for use in loading the application for execution.

20 Claims, 10 Drawing Sheets

(56) References Cited

U.S. PATENT DOCUMENTS

| | | | |
|---|---|---|---|
| 7,987,457 B2 | 7/2011 | Biswas et al. | |
| 2004/0098731 A1 | 5/2004 | Demsey et al. | |
| 2005/0102649 A1* | 5/2005 | Hogg et al. | 717/100 |
| 2005/0193369 A1* | 9/2005 | Brumme et al. | 717/106 |
| 2009/0064196 A1* | 3/2009 | Richardson et al. | 719/327 |
| 2011/0258615 A1* | 10/2011 | Sollich | G06F 8/44 717/146 |
| 2012/0102483 A1 | 4/2012 | Goldman | |
| 2013/0125107 A1* | 5/2013 | Bandakka et al. | 717/171 |

OTHER PUBLICATIONS

Benitez et al., "The Advantages of Machine-Dependent Global Optimization," *In Proceedings of Conference on Programming Languages and System Architectures*, Zurich, Switzerland, Mar. 2, 1994, 17 pages.

"Why .NET is the Best Thing to Happen to Software Since OOP", Published on: Apr. 17, 2005, 4 pages.

International Preliminary Report on Patentability dated Mar. 19, 2015, from International Patent Application No. PCT/US2013/057892, 12 pp.

Anderson et al., "The Binary Compatibility Standard," *IEEE*, pp. 32-37 (Feb. 1989).

International Search Report and Written Opinion dated Feb. 12, 2014, for International Patent Application No. PCT/US2013/057892, 17 pp.

Ke et al., "Data Communication Analysis and Algorithm for the Efficiency of Data Distribution in High Performance Computing," *Int'l Conf. on Advanced Computer Theory and Engineering*, pp. 566-570 (Dec. 2008).

Zhang et al., "System Support for Automatic Profiling nad Optimization," *ACM SIGOPS Operating Systems Review*, vol. 31, Issue 5, pp. 15-26 (Dec. 1997).

Office Action dated Sep. 22, 2015, from Colombian Patent Application No. 15-50660-6 (no English translation available), 3 pp.

Office Action dated May 19, 2016, from Chile Patent Application No. 524-2015 (No English translation available), 5 pp.

Office Action dated Aug. 22, 2016, from Mexico Patent Application No. MX/a/2015/002906 (No English translation available), 2 pp.

Office Action dated Dec. 2, 2016, from European Patent Application No. 13765843.1, 4 pp.

Office Action dated Dec. 21, 2016, from Chile Patent Application No. 524-2015, (No English translation available), 5 pp.

* cited by examiner

SOFTWARE 1080 IMPLEMENTING DESCRIBED TECHNOLOGIES FOR GENERATING NATIVE CODE FROM IL CODE FOR APPLICATIONS

GENERATING NATIVE CODE FROM INTERMEDIATE LANGUAGE CODE FOR AN APPLICATION

BACKGROUND

Various mobile devices also support applications that can be downloaded in a representation that cannot be executed directly but can be executed when compiled on a mobile device using just-in-time compilation (JIT compilation). Although JIT compilation of code has been used to run applications on a computer, running applications using JIT compilation has limitations, including additional time needed for compilation when the application runs, and potentially non-optimal decisions made during compilation.

SUMMARY

Among other innovations described herein, this disclosure presents various representative embodiments of tools and techniques for installing, executing, and/or updating managed applications through generation of native code from code in an intermediate language. According to one exemplary technique, a computing device receives machine dependent intermediate language code (MDIL code) generated by an online provider for an application. The computing device installs the application on the computing device by generating a native image for the application, including by binding a portion of the MDIL code with one or more libraries on the computing device. Also, the native image is stored on the computing device for use when loading the application for execution.

According to an exemplary tool, a computing device receives, from an online provider, an installation package for an application, where the installation package includes a set of machine dependent intermediate language files (MDIL files). Additionally, a binder of the computing device is provided at least one file of the set of MDIL files and one or more libraries to be bound to the at least one file. The binder generates a native image for the application by binding MDIL code of the at least one MDIL file using the one or more libraries.

In another exemplary technique, an online provider generates MDIL code from preliminary code for an application. A computer system generates a set of MDIL files for the application by compiling preliminary code of the application into MDIL code, then signs respective files of the set of MDIL files to indicate the respective files are trusted as being from an online marketplace. The computer system generates a binding list that identifies the respective files of the set of MDIL files, and also generates an installation package for the application comprising the set of MDIL files for the application and the binding list. The computer system then provides, at the online marketplace, the installation package for downloading.

When it receives the installation package, a computing device receives the MDIL code and generates a native image for the application to install the application on the computing device. Additionally, a runtime engine of the computing device and/or one or more libraries used by the installed application can be updated on the computing device during an update to the computing device, and the application is automatically updated in response. The application is updated by generating an updated native image for the application using the one or more libraries that were updated. The updated native image is generated such that it is runnable using the updated runtime engine on the computing device. After the updated native image is generated, the application is run by loading the updated native image instead of the previously generated native image.

This summary is provided to introduce a selection of concepts in a simplified form that are further described below. This summary is not intended to identify key features or essential features of the claimed subject matter, nor is it intended to be used to limit the scope of the claimed subject matter. The foregoing and other objects, features, and advantages of the technologies will become more apparent from the following detailed description, which proceeds with reference to the accompanying figures.

DETAILED DESCRIPTION

This disclosure presents various representative embodiments of tools and techniques for installing, executing, and/or updating managed applications through generation of native code from code in an intermediate language. For example, a computing device receives MDIL code generated by an online provider for an application. The computing device installs the application by generating a native image for the application. As part of the generation of the native image, the computing device binds a portion of the MDIL code with one or more libraries on the computing device. The computing device stores the native image for use when loading the application for execution. In this way, performance of the application can benefit from previous offline compilation of at least part of the application (to produce MDIL code appropriate for the device). At the same time, this approach can facilitate updating of the application when there is a change to a library used by the application and/or MDIL code for the application.

The various features of the techniques and tools described herein can be used in combination or separately, depending on implementation. Different features of the techniques and tools described herein affect different stages of processing, including ingestion, installation, execution, application update and device update. The term ingestion generally refers to the process in which a developer uploads an application to an online provider, which processes the application for efficient execution on one or more types of computing devices, validates the application, and makes the application available for download. The term installation generally refers to the process of adapting the application to run on a specific computing device, which converts the application to a form more suitable for prompt and secure execution on the device (e.g., converting MDIL code to native instructions during binding by resolving references to libraries and other resources, storing a native image that can be loaded for execution, marking the application as trusted, etc.). During execution, the trusted native image for the application can be quickly loaded and run. The term application update generally refers to the process in which an application is updated (e.g., MDIL code for the application), which can involve re-installation of the application on the device. The term computing device update generally refers to the process that follows after a runtime engine, a library or other resource referenced by an application has been updated, which typically involves re-binding applications that depend on the library or other resource that has changed.

Figure 1:
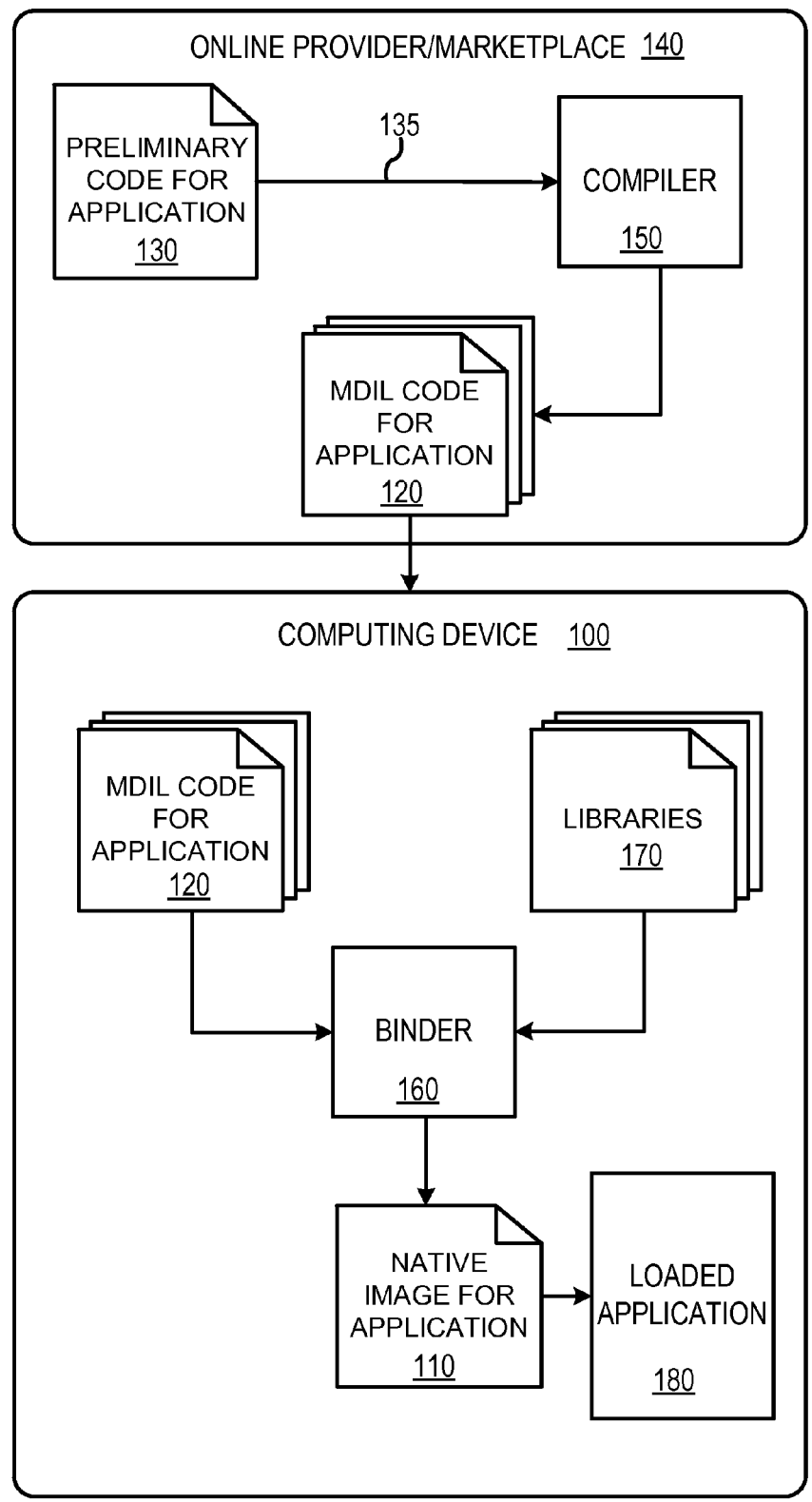
FIG. 1 is a diagram illustrating an exemplary online provider/marketplace and exemplary computing device that loads a native image of an application installed by binding machine dependent intermediate language code (MDIL code).

Exemplary System for Installing and Loading an Application by Generating Native Code from Code in a MDIL FIG. 1 is a diagram illustrating an exemplary online provider/marketplace and exemplary computing device 100 that loads a native image 110 of an application installed by binding MDIL code 120. In FIG. 1, preliminary code 130 for the application is received by an online provider 140. For example, the preliminary code 130 can be code for the application that is source code or code in an intermediate language such as Microsoft Intermediate Language (MSIL). At 135, the preliminary code is provided to a compiler 150 that compiles the preliminary code 130 into the MDIL code 120 for the application. The preliminary code 130 can be a higher level representation of the code for the application than the MDIL code 120. For example, the preliminary code 130 is in an intermediate language (IL) that is at a higher level than the MDIL code 120, which is at a level closer to machine code. The MDIL code 120 can be machine dependent such that it includes native code that is based on a processor instruction set. The processor instruction set can be an instruction set for an ARM processor, an x86 processor, or other processor. The MDIL code 120 can also include unresolved pseudo instructions with symbolic references which can be resolved to generate native code through binding.

The MDIL code 120 for the application is received at the computing device 100. As part of the installation of the application, the MDIL code 120 is provided to a binder 160 that binds the MDIL code 120 to one or more libraries 170 on the device. The one or more libraries 170 can be code libraries and/or framework libraries for classes, types, or the like. By binding the MDIL code 120 on the computing device 100, the binder 160 generates the native image 110 of the application. The native image 110 includes native code for the application and is stored at the device. At 180, the native image is loaded to execute the application.

Figure 2:
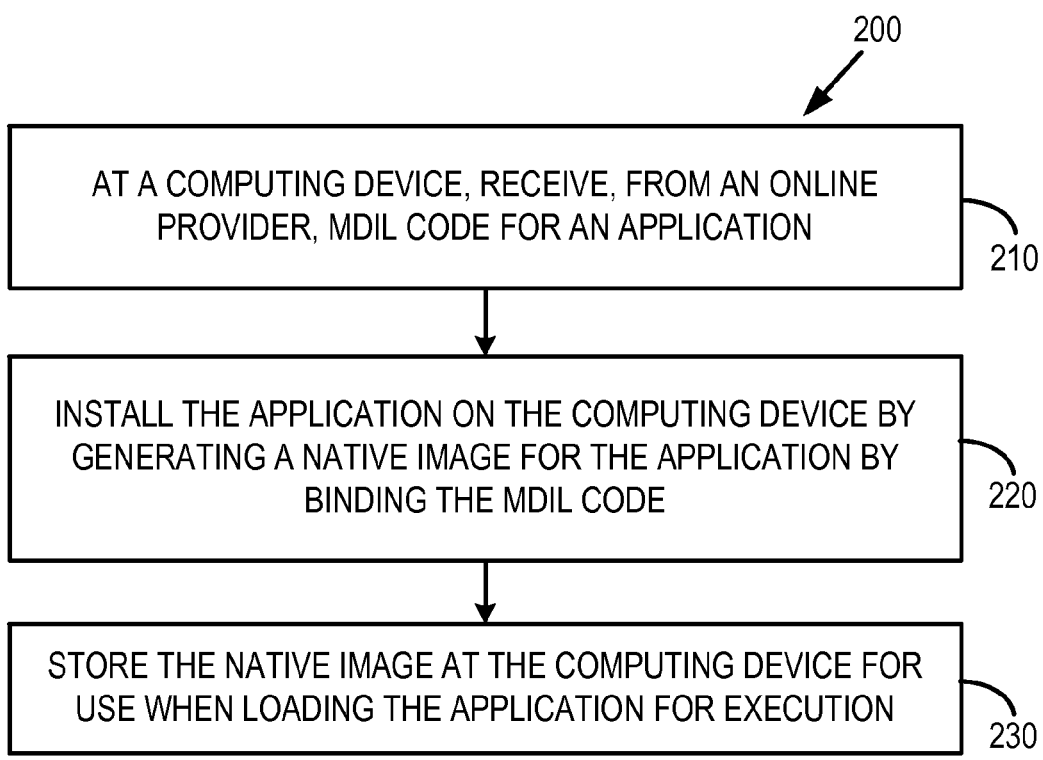
FIG. 2 is a flow diagram of an exemplary method of binding MDIL code of an application to install the application on a computing device.

Exemplary Method for Binding MDIL Code to Install an Application on a Computing Device FIG. 2 is a flow diagram of an exemplary method 200 of binding MDIL code of an application to install the application on a computing device. In various implementations, the illustrated method blocks of FIG. 2 may be merged, divided into sub-blocks, or omitted.

In FIG. 2, a computing device receives MDIL code for the application from an online provider at 210. For example, the computing device can receive one or more files which include code for the application, where the code is in an IL that is machine dependent such as code in Machine Dependent Intermediate Language as described in U.S. Patent Application Publication No.: US 2011/0258615 or in another machine dependent intermediate language. Since the MDIL code is received at the computing device from the online provider, the MDIL code can be generated from compilation by the online provider or elsewhere in the cloud. For example, the online provider compiles preliminary code for the application to generate the MDIL code for the application.

In some implementations, an installation package for the application is received and the installation package includes the MDIL code for the application. The installation package for an application can include other information for the application such as resource files for the application. The MDIL code for an application can be stored on the computing device for installation of the application and for subsequent updating of the application.

At 220, the application is installed on the computing device by generating a native image of the application, which includes binding the MDIL code of the application. For example, a binder can bind the MDIL code to one or more libraries available on the computing device to generate a native image for the application that is executable. The application can be a managed application executed using a runtime or execution engine such as the Common Language Runtime of the .NET framework, or other runtime engine. A runtime engine and/or execution engine can be a software layer on which the application ultimately runs. In some implementations, a managed application is an application that executes using a framework that includes one or more shared libraries and one or more managed code runtime environments. For example, libraries are base class libraries that are shared among applications. In some implementations, a library on a computing device can be an image of the library that is in native and/or machine code, which can be loaded into memory for use by a managed application that is also loaded into memory. In some implementations, the generated native image can be generated by a binder such that the native image is runnable by a runtime or execution engine that is used to run the application on the computing device. For example, the binder can use and/or reference the runtime engine for the application during binding so that the binding is appropriate for execution using the runtime engine.

In some implementations, the binding, of the binder, resolves the MDIL code and generates native code for the application that is included in the native image for the application. The native code can be machine code that is executable on a particular processor and that uses instructions from a processor instruction set. The processor instruction set can be an instruction set for an ARM processor, an x86 processor, or other processor. In some implementations, in generating the native image, for each MDIL file in the set of files received for the application, the respective MDIL file and the one or more libraries that are to be bound to the MDIL code of the file are provided to the binder. For example, one or more file paths to MDIL files and/or library files can be provided to the binder. The binder binds the respective MDIL files to the libraries provided to the binder to generate the native image for the application. The native image can include native code such as machine code that is executable by the processor of the computing device. (In addition to the native image, at least some code for the application can be kept in an IL form, for just-in-time compilation or other compilation before the application is launched or when the application is launched. This may be useful when resources frequently changes, or when a type value or other reference cannot be resolved when the application is installed and remaining MDIL code is bound to libraries on the device.)

In some implementations, the application can be installed on the device by a package manager. For example, during installation of the application, a received installation package for the application can be unpacked by a package manager. If the installation package and/or one or more of the files included in the installation package are compressed, then the package manager can decompress such files. If one or more files are not compressed then the package manager does not decompress such files. The package manager can provide each of the MDIL files that are to be bound to the binder along with the libraries that are to be bound to the respective MDIL files. In some implementations, the package manager provides the MDIL files and/or the one or more libraries by providing references to the MDIL files and/or the one or more libraries to the binder. The binder binds the respective MDIL files to the provided libraries for the respective MDIL files to generate the native image of the application. The native image can be generated by the binder such that the native image is runnable using the runtime engine available on the computing device for running the application.

At 230, the native image of the application is stored on the computing device for use when loading the application for execution. For example, the native image generated is loaded to execute the application (and the MDIL code that is not executable is not used to execute the application). In some implementations, the native image is determined as being trusted before being loaded for execution. In other implementations, the computing device does not make any determination about whether the native image is trusted before the native image is loaded for execution.

Figure 3:
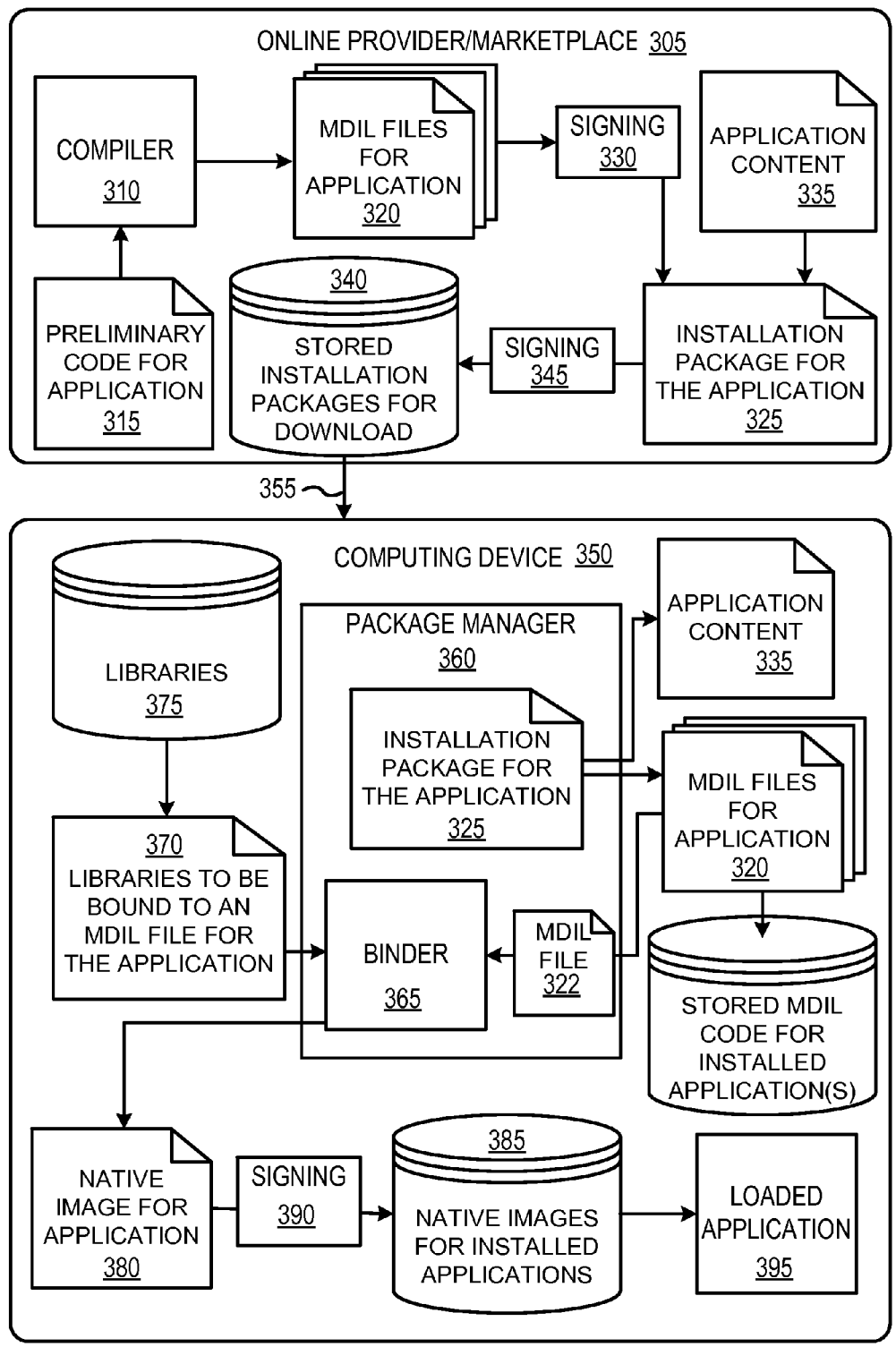
FIG. 3 is diagram illustrating an exemplary online provider/marketplace and exemplary computing device that can install one or more managed applications by generating one or more native images from code in an intermediate language that is provided and generated by the online provider/marketplace (or other online providers/marketplaces).

Exemplary System for Generating Native Code from Provided MDIL Code for Application Installation and Execution FIG. 3 is diagram illustrating an exemplary online provider/marketplace and exemplary computing device 350 that can install one or more managed applications by generating one or more native images from code in an intermediate language such as a MDIL that is provided and generated by the online provider (or other online providers). In FIG. 3, an online provider 305 uses a compiler 310 to compile preliminary code 315 into one or more MDIL files 320, which are files that include code in a MDIL. The set of the one or more MDIL files 320 are packaged into an installation package 325 for the application. Each of the MDIL files can be signed as being trusted, as shown at 330. One or more files 335 that include support information such as resource files or application content can be included in the installation package 325. The installation package 325 is stored by the online provider 305 and is offered for downloading, as shown at 340. Before the installation package 325 is downloaded from the online provider 305, the installation package 325 itself can be signed as trusted, as shown at 345.

Thus, the installation package 325 is offered as part of a catalog of applications in an online marketplace. Different versions of the installation package 325 can be offered for different types of computing devices. For example, different types of MDIL code (adapted for different types of processors) are included in different installation packages for the different types of computing devices. The installation packages available for different types of computing devices can also include a version with non-MDIL code (e.g., MSIL code in a XAP file) for purposes of backward compatibility.

The computing device 350 downloads one or more installation packages, including the installation package 325, from the online provider at 355. As part of installing the application, the package manager 360 of the computing device 350 unpacks the one or more MDIL files 320 and the one or more files 335 that include support information for the application. The package manager also invokes a binder 365. For each MDIL file of the set of the one or more MDIL files 320, the package manager 360 provides the respective MDIL file such as MDIL file 322 to the binder 365 along with the one or more libraries to be bound with the respective MDIL file, such as the one or more libraries 370. The binder 365 binds the respective MDIL file to the one or more libraries provided for the respective MDIL file to generate native code. The libraries provided for the MDIL files (such as the one or more libraries 370) are included in the set of libraries 375 that are on the computing device 350. Using the native code generated from binding the one or more MDIL files 320, the binder generates a native image 380 for the application. The native image 380 can be generated by the binder 365 such that the native image 380 is runnable using a runtime engine on the computing device that can run the application. The native image 380 is stored as part of installing the application on the device, as shown at 385. The computing device 350 can also install one or more other applications and store generated native images corresponding to the respective other applications.

As shown at 390, the native image 380 can be signed as trusted code that was generated from trusted code by the binder 365. The native image 380 can be signed before it is stored and/or loaded for use in executing the application. At 395, the native image 380 is loaded to execute the application. When loaded, the native code of the native image is executed by the computing device 305 to provide the functionality of the application.

Figure 4:
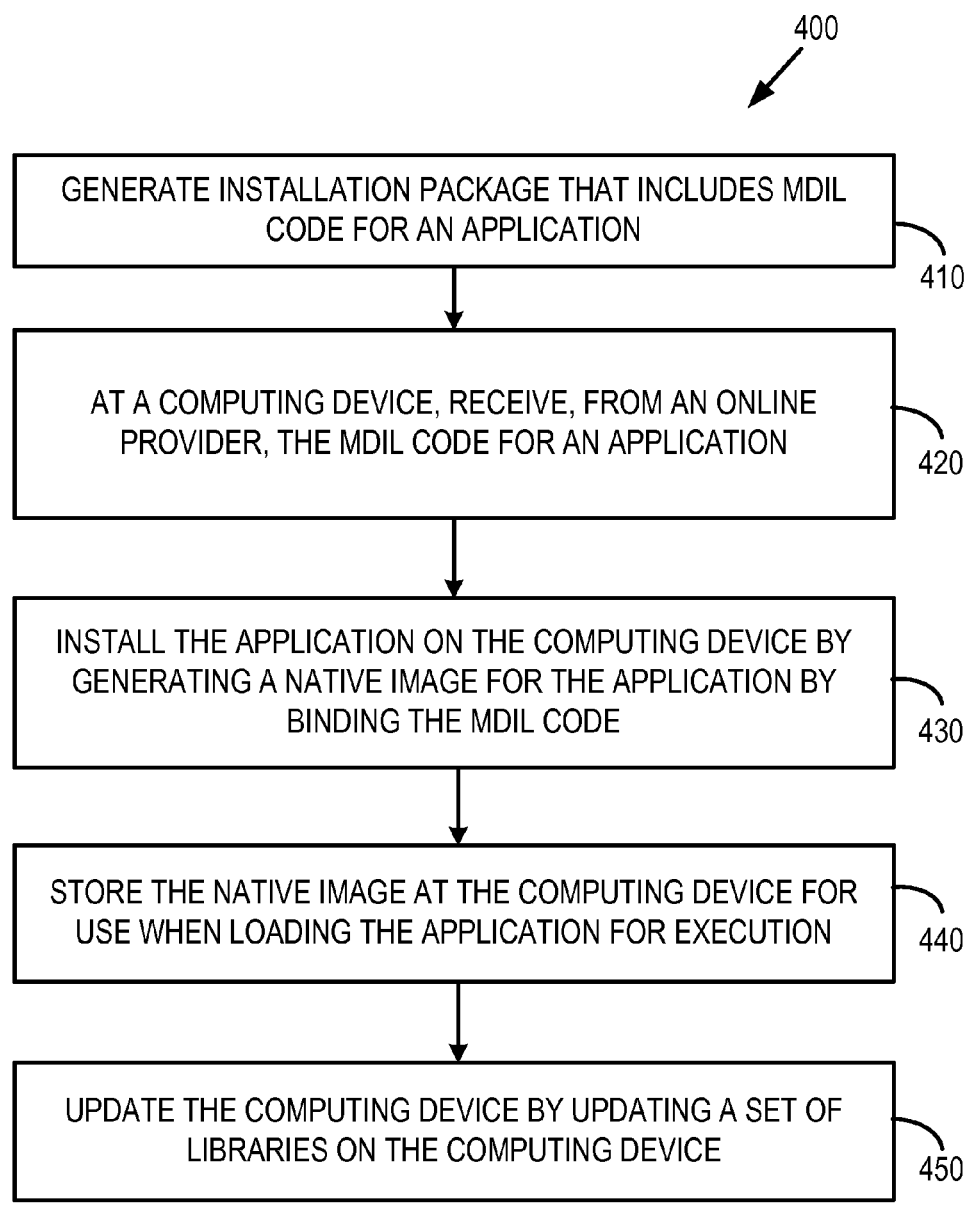
FIG. 4 is a flow diagram of an exemplary method for installing and updating an application through native code generation using code in a MDIL.

Exemplary Method for Installing and Updating an Application Through Native Code Generation Using Code in a MDIL FIG. 4 is a flow diagram of an exemplary method 400 for installing and updating an application through native code generation using code in a MDIL. In FIG. 4, as shown at 410, an installation package is generated that includes MDIL code. In some implementations, the MDIL code can be included in one or more files. In some implementations, preliminary code can be compiled to generate the MDIL code.

In some implementations, the MDIL code for the application includes native code based on a processor instruction set, but can also include pseudo instructions. For example, a pseudo instruction includes a symbolic reference and/or field key that cannot be resolved when the MDIL is generated. Thus, in some implementations, pseudo instructions can include symbolic references to fields, types, or the like. For example, the symbolic references can be tokens that identify a field or a type to be used without specifically indicating a field's offset or a type's size. In some implementations, a symbolic reference can be a token that can be interpreted by a binder to determine native code to be generated for the symbolic reference. For example, for a token such as a field token that references a field of an object, a binder on a particular computing device can (1) lay out the object as it is available on the computing device through a library and (2) determine the appropriate offset for the field of the object, when generating executable instructions for the computing device. Thus, in some implementations, field offsets for objects in MDIL code can be symbolic instead of hard coded as a numeric offset (such as in a corresponding native code).

The pseudo instruction can abstract implementation details which are to be determined and/or resolved when the pseudo instruction is bound to an appropriate library on a computing device. In some implementations, MDIL code includes pseudo instructions that include symbolic references that can be converted by a binder to produce native instructions that are executable by a processor. For example, MDIL code can include pseudo instructions that can be converted by a binder into machine instructions for accessing a field of an object which is managed by a runtime engine such as the Common Language Runtime (CLR) of the .NET framework or the like. In some implementations, pseudo instructions in the MDIL code can be similar to machine code in a native language such that registers are already allocated but offsets have not been included for one or more libraries and/or classes. For example, the field offset included in a native instruction as converted from the pseudo instruction can be determined by a binder and can depend on a version of a library available and/or on a computing device. In some implementations, MDIL code can include pseudo instructions that can be converted by a binder into machine instructions for looking up an instantiation or instance of a generic type or method.

With reference to FIG. 4, at 420, a computing device receives the MDIL code for an application. For example, the computing device can receive an installation package for the application that includes MDIL files that include the MDIL code for the application. In some implementations, the installation package can include a binding list that includes a listing of the MDIL files of the application that are to be bound to generate a native image for the application and listing of the set of one or more libraries that are to be bound to the respective MDIL files. In some implementations, one or more of the libraries to be bound to the MDIL code of an application are libraries that are declared and/or included in the source code of the application. One or more other libraries to be bound to the MDIL code of an application can be libraries that are not declared and/or included in the source code of the application.

At 430, the application is installed on the computing device by generating a native image for the application. In some implementations, the application can be installed by a package manager. For example, the package manager can determine that the installation package is signed as trusted before using its files to install the application on the computing device, and if the installation package is not signed as trusted, the package manager does not use the installation package to install the application on the computing device. The package manager can provide each of the MDIL files that are to be bound to the binder along with the libraries that are to be bound to the respective MDIL files. In some implementations, instead of or in addition to determining whether the entire installation package is signed as trusted, the MDIL files can be determined to be signed as trusted before being used to generate a native image for the application, and MDIL files that are determined not to be signed as trusted are not used to generate a native image for the application. In some implementations, the package manager can be provided and use a binding list to automatically determine and identify the MDIL files that are to be bound and the respective libraries that are to be bound the code of the respective MDIL files for the application. The binding list can be in a machine readable format such as in a programming, scripting, or markup language. For example, the binding list can be included in a file that includes information organized using the Extensible Markup Language (XML).

In some implementations, the package manager provides the MDIL files and/or the one or more libraries to the binder by providing references to the MDIL files and/or the one or more libraries to the binder. The binder binds the respective MDIL files to the provided libraries for the respective MDIL files to generate the native image of the application. At a high level, the binder reads in MDIL instructions, converts IL instructions to native instructions, and passes through instructions that are already in native form. For example, a binder can bind the MDIL code to one or more libraries on the computing device to generate a native image for the application that is executable. The native image can be generated by the binder such that the native image is runnable using the runtime engine on the computing device, that is available to the binder, that is for running the application. The runtime engine can be a software layer that can ultimately run the application on the computing device. In some implementations, the binder can be run using information from a script, user input and/or other information. In some implementations of binding code, the MDIL code is provided to the binder. The binder resolves the pseudo instructions to generate corresponding native instructions. For example, from symbolic references (e.g., field token) in pseudo instructions, the binder can generate native code by determining and specifying numeric offsets for fields based on a type layout. In some implementations, the MDIL pseudo instructions can be used to create native instructions which can differ in length from the pseudo instructions. Alternatively, the native instructions may not differ in length from the pseudo instructions. In some implementations, at least some of the MDIL code for an application can be close to the machine code included in a native image of the application; however, other parts of the MDIL code can provide a level of abstraction that allows a portion of the MDIL code to be bound to a library that can be available in one or more versions. Through binding, the MDIL code can be used to generate executable code that executes using a particular version of the library. For example, binding MDIL code to a first set of libraries can generate executable code for the application. Or, binding the MDIL code to the set libraries with one or more of the libraries being of a different version can also generate executable code for the application. The sets of versions of the one or more libraries can have overlapping versions of libraries.

In some implementations, binding MDIL code generates code that can be directly executed by a processor without further compilation. For example, binding MDIL code to a library includes generating a native instruction from an instruction in the MDIL code. In some implementations, MDIL code includes pseudo instructions that include symbolic references that are converted and/or bound by a binder to produce native instructions that are executable by a processor. For example, a binder can convert pseudo instructions into native code instructions for accessing a field of an object which can be managed by a runtime engine on the computing device. In some implementations, parts of the MDIL code can be similar to the generated native code such that registers are allocated, but in the MDIL code offsets have not been included for one or more libraries and/or classes. In some implementations, a binder can convert pseudo instructions into native code instructions for looking up an instantiation or instance of a generic type or method.

In some implementations, MDIL code symbolic instructions and the generated corresponding native instructions are consistent with regard to virtual method slot assignment and/or object field layout. For example, the MDIL code and the executable native code can be consistent with regard to object field layout, such that a portion of MDIL code for accessing objects that includes a field token can be used to generate native instructions (e.g., machine instructions) using numeric field offsets. In some implementations, the binder can generate a numeric offset from a symbolic reference to generate one or more executable machine instructions. For example, a symbolic reference in the MDIL code is converted by a binder into a specific field reference such that the specific field reference includes a numeric size and/or offset.

In some implementations of binding MDIL code, a binder can interpret a symbolic reference that includes a token to determine native code to be generated for the symbolic reference. For example, for a field token that references a field of an object, the binder can lay out the object as it can be available on the computing device and determine the appropriate offset for the field of the object for generating executable instructions for the computing device. In some implementations of binding MDIL code, a binder that can bind MDIL code is more complicated than a linker. For example, in binding MDIL code, the binder can adjust one or more jumps in resulting native code so that the jumps are to their intended targets.

In addition to native code in the native image, at least some code for the application can be kept in an IL form. The code in IL form is further processed during just-in-time compilation or other compilation before the application is launched or when the application is launched. This may be useful when a runtime engine, a library, or other resource frequently changes. Or, it may be useful when a type value or reference cannot be resolved during the binding process in which remaining MDIL code is bound to libraries on the computing device.

At 440, the native image is stored for use when loading the application for execution. For example, when a user launches the application on the computing device, the native image of the application is loaded by an execution engine or runtime such as the CLR of the .NET framework or other runtime engine. In some implementations, the computing device can include MSIL code for the application that can be compiled on the computing device using just-in-time compiling to execute the application, but instead of executing the application using the MSIL code, the native image for the application is loaded and executed to run the application. In some implementations, when the native image is loaded, one or more library images or assemblies are loaded that are used by the code of the application as included in the native image. For example, the native image can be loaded for execution using a runtime engine of the computing device. The native image for the application can be signed by the binder before it is stored, to show that the application is trusted.

At 450, the computing device is updated at least by updating a set of libraries on the computing device. For example, one or more of the libraries in the set of libraries of the computing device can be updated, replaced, or changed. This can disrupt the operation of applications that were bound to a previous version of the set of libraries. Thus, after the one or more libraries are updated, replaced, or changed, one or more of the applications on the computing device can be updated such that an updated native image for the respective applications can be generated. An updated native image for an application can be generated by binding MDIL code for the application (which is stored in MDIL form on the computing device even after installation) to at least one of the set of one or more libraries that were updated. The rebinding of the MDIL code for the application to one or more of the libraries on the computing device after libraries are updated can allow the native images to properly reference the one or more libraries as available on the computing device after updating the device and/or updating libraries of the device. At the same time, complete re-compilation of code for an application is not needed every time a library changes, since the MDIL code for the application can be reused. When the changed library is used by many of the applications on a device, re-binding using previously stored MDIL code for the respective applications can greatly simplify the process of updating native images for the respective applications.

For example, suppose seven applications each have a dependency on a library that has been changed. For each of the seven applications, offline compilation in the cloud (e.g., by an online provider) can produce efficient MDIL code for that application, using compilation that is more sophisticated and/or time-consuming that just-in-time compilation or compilation on a device for purposes of updating. Rather than re-compile each of the seven applications when the library changes, which would be time-consuming and might lead to a less efficient native image, the respective applications are re-bound to libraries on the computing device, which is much faster since the "heavy lifting" on compilation optimization was previously done in the cloud.

In some implementations, the computing device is updated such that the updating includes updating a runtime engine of the computing device. For example, the runtime engine, of the computing device, that runs one or more installed applications using native images for the applications can be updated, replaced, or changed. The runtime engine can be the software layer that ultimately runs an updated application so when the runtime engine is changed an updated native image for an updated application can be generated by a binder to be executable using the updated runtime engine as available to the binder and on the computing device. In some implementations, both a runtime engine and libraries of the computing device are changed upon a device update and an application can be updated so that it can be executed and/or run properly with the updated runtime engine and updated libraries.

Figure 5:
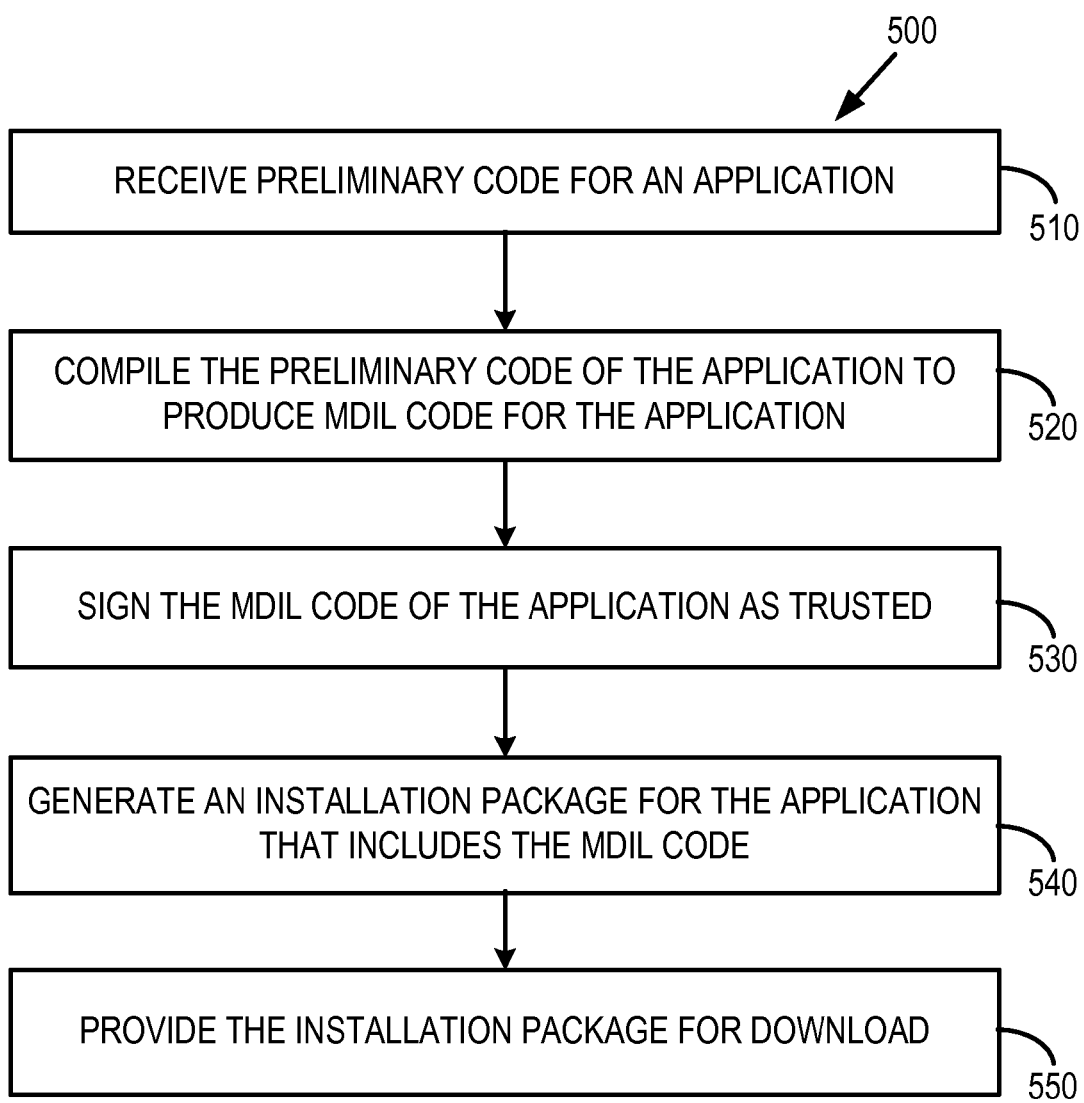
FIG. 5 is a flow diagram of an exemplary method of generating an installation package for an application, where the installation package can be provided for download.

Exemplary Method for Generating an Installation
Package for an Application that can be Provided
for Download FIG. 5 is an exemplary method 500 of generating an installation package for an application that can be provided for download. In various implementations, the illustrated method blocks of FIG. 5 may be merged, divided into sub-blocks, or omitted. In FIG. 5, preliminary code for an application is received. For example, a developer of an application can send code for the application in a preliminary language and/or state, and the preliminary code for the application can be received by an online provider such as an online marketplace. In some implementations, the preliminary code for the application is source code for the application. For example, source code can be code written in one or more programming languages such as C++, C#, Visual Basic®, J#, J++, or other like programming languages. In some implementations, the preliminary code for the application is in an intermediate representation such as in an IL. For example, source code for the application can be compiled by a compiler and/or a generator into an intermediate representation in an IL. In some implementations, the IL can be in Microsoft Intermediate Language (MSIL). In some implementations, the IL does not include native instructions that are machine dependent. The code in IL can be compiled, however, into code in a MDIL that includes native instructions that are machine dependent.

In some implementations, other information is received for the application as well as the preliminary code for the application. For example, resource files for the application can be received that are used by the application when it is executed. Resource files for applications can be one or more files that include sound information, music information, graphics information, video information, other media information, data base information, text information, and the like. In some implementations, the preliminary code can be packaged in and/or received in one or more compressed files such as a ZIP file or a XAP file. Alternatively, the preliminary code is not packaged in and/or received in one or more compressed files. In some implementations, one or more files with MDIL code for the application are received by the online provider, but MDIL files received from the developer can be discarded as untrusted files that were not generated by the online provider. Alternatively, the online provider does not discard any MDIL files received by the online provider. In some implementations, the preliminary code can be received in one or more assemblies. For example, preliminary code (such as code in MSIL included in an assembly) can be compiled into code that is at a binary level. An assembly that includes MSIL code can be an MSIL assembly. In some implementations, an MSIL assembly can comprise one or more files.

At 520, the preliminary code of the application is compiled to produce MDIL code which is code that is in an intermediate language that is machine dependent. As a general rule, decisions or references within an IL file are resolved during the compilation process, but decisions or references to a library, external source, external type, etc. are left unresolved. The MDIL file is thus a mix of (a) assembly instructions, native code or other device dependent instructions and (b) pseudocode instructions or other device independent instructions that are to be resolved later. Thus, the MDIL code compiled from the preliminary code can be in an intermediate language that is a lower level language than the language of the preliminary code. For example, the preliminary code is in an intermediate language that is at a higher level (further away from machine code), and the MDIL code is at a lower level that is closer to machine code. Even so, the MDIL code is typically not directly executable without being bound, because the MDIL code includes symbolic references that are not native code. Instead, the MDIL code can be converted to executable machine code by a binder. In some implementations, the preliminary code for the application is not directly executable but can be compiled into executable code when it is compiled by a just-in-time compiler. For example, code for the application in MSIL can be just-in-time compiled to run the application from the MSIL code. In some implementations, code for an application in MSIL can be provided to a compiler to generate MDIL code for the application. Typically, the MSIL code does not include native instructions, nor does it include the pseudo instructions included in the MDIL code that are to be resolved and/or bound by a binder to generate native code for the application.

The MDIL code can be included in one or more MDIL files. In some implementations, an MDIL file can have a name and/or file extension such that ".mdil" is included in the name and/or file extension of the MDIL file. In other implementations, an MDIL file can have another naming convention, such that ".mdil" is not included in the name and/or file extension of the MDIL file.

In some implementations, when the preliminary code is compiled, in addition to pseudo instructions, the compiler produces one or more assemblies for the MDIL code. For example, MDIL code included in an assembly can be compiled into code that is at a binary level. An assembly that includes MDIL code can be an MDIL assembly. In some implementations, an MDIL assembly can comprise one or more files.

Compiling the preliminary code into MDIL code for the application before the application code is received at a target computing device (on which the application is to be executed) can provide various advantages. For example, compile time can be removed from the time it takes to install the application on the target computing device. Removing the compilation from the installation of the application on the target device can also allow for compile-time optimizations of the code to be done in the cloud, without that time being added to the time it takes to install the application on a target device. In particular, this can help avoid time-consuming re-compilation on the target computing device for multiple applications that depend on a library whenever the library is changed and/or when a runtime engine is changed.

In some implementations the compilation of the preliminary code can produce one or more native code files for the application that include native code for the application and do not include MDIL code.

In some implementations, for each MSIL assembly file received for the application a corresponding MDIL file is generated by a compiler. The preliminary code can be compiled to generate MDIL code that is dependent on an instruction set for a first processor (for a first type of target computing device), and different MDIL code can be generated that is dependent on an instruction set for a second processor (for a second type of target computing device). For example, compiling preliminary code for an application can produce MDIL code that can be bound to run on a device that has a first processor, and produce different MDIL code for the application that can be bound to run on another device with a different second processor. For example, the first processor can be an ARM processor and the second processor can be an x86 processor.

At 530, the MDIL code of the application is signed as trusted. For example, MDIL code files generated from the preliminary code can be signed with a publisher key to indicate that the signed files include trusted code. In some implementations, native code generated by compiling preliminary code can be signed as trusted. For example, native code files that are generated by a compiler can be signed with a publisher key to indicate that the signed files include trusted code.

At 540, an installation package is generated that includes the MDIL code. For example, the MDIL code can be packaged into a container such as one or more files that can be downloaded for installing the application. In one implementation, the MDIL code in one or more MDIL code files are packaged into one or more compressed files such as a ZIP file or a XAP file. A compressed installation package can lower the amount of data to be downloaded for the application from the online provider. Alternatively, the installation package is not in a compressed form. Different types of MDIL code (adapted for different types of processors) can be included in different installation packages for different types of computing devices. The installation packages available for different types of computing devices can also include a version with non-MDIL code (e.g., MSIL code in a XAP file) for purposes of backward compatibility.

In some implementations, the installation package can include other information for the application such as resource files for the application. For example, resource files for the application can be received that can be used by the application when it is executed. Resource files for applications can be one or more files that include sound information, music information, graphics information, video information, other media information, data base information, text information, and the like. The installation package can also include a listing of files that are included in the installation package. The listing of files can include information about the files included in the installation package. For example, the installation package can include a file that includes information organized using Extensible Markup Language (XML). The XML file can include a list of the files that are included in the installation package. For each of the files listed, the XML file can include information associated with the listed file. For example, the XML file can list each of the MDIL code files included in the installation package and indicate that each of the MDIL code files are able to be bound. The XML file can also indicate the one or more libraries that are to be bound to the code of respective listed MDIL code files.

In some implementations, the generated installation package itself is signed as trusted. For example, the installation package can be signed with a publisher key to indicate that it includes code and/or other information that is trusted. In some implementations, the installation package can be encrypted.

At 550, the installation package is provided for downloading. For example, the online provider and/or partner of the online provider can store the installation package for download. The online provider can be an online marketplace from which one or more applications can be downloaded for installation onto one or more computing devices. The application can be included in a catalogue of applications that are available for downloading from the online marketplace. For example, the application can be downloaded by a computing device using the internet and/or the cloud. The application can be downloaded such that the installation package for the application is downloaded. In some implementations, the application can be downloaded to a computing device after the application has been purchased and authorized to be downloaded to the computing device. In some implementations, the application can be downloaded without being purchased. For example, the application can be offered and downloaded for free.

Figure 6:
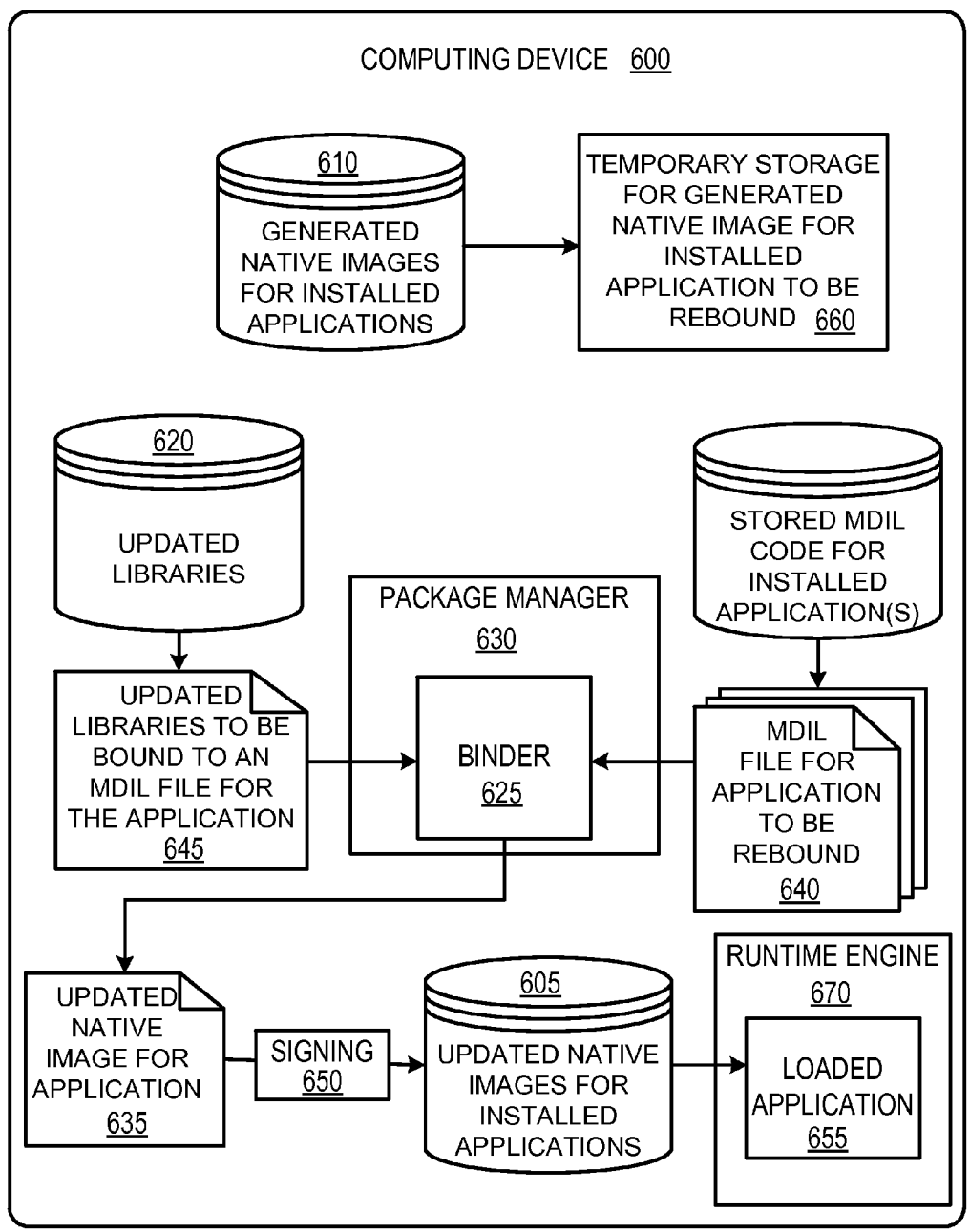
FIG. 6 is a diagram of a computing device that can generate one or more updated native images for one or more installed applications.

Exemplary System for Generating Updated Native Images for Installed Applications FIG. 6 is a diagram of a computing device 600 that can generate one or more updated native images 605 for one or more installed applications. In FIG. 6, the computing device includes one or more generated native images 610 for the one or more installed applications on the computing device. The computing device 600 includes updated libraries 620, which include one or more libraries that were updated after being bound to respective MDIL code of applications to generate the one or more native images 610. Because at least one of the libraries that were bound to the one or more native images 610 were updated, the computing device 600 updates the applications installed on it by generating the one or more updated native images 605 for the installed applications. The computing device also includes an updated runtime engine 670.

In generating the one or more updated native images 605 for the installed applications, a binder 625 generates an updated native image for each of one or more installed applications. As shown in FIG. 6, for each installed application that has a native image that was bound to at least one library that has been changed and/or updated, the package manager 630 provides the binder 625 the MDIL files of the respective application for rebinding to generate an updated native image for the application being updated, such as the updated native image 635. The updated native images can be generated by the binder 625 such that the native images are executable using the updated runtime engine 670.

To generate the updated native image 635, for each MDIL file for the application being updated, binder 625 is provided the respective MDIL file of the application such as MDIL file 640 and one or more libraries such as the one or more libraries 645 that are to be bound to the MDIL file. The one or more libraries provided for binding to the code of the MDIL file can include at least on library that has been updated and is included in the set of updated libraries 620. In some implementations, one or more libraries bound to the code of an MDIL file of an application being updated have not been updated.

When generated, the updated native image for the application, such as the updated native image 635, is stored as at least one of the one or more updated native images 605 for the installed applications on the computing device. The updated native image can also be signed as trusted code, as shown at 650, before the updated native image is used to execute the application. At 655, the computing device loads a generated updated native image for an application to execute the application instead of the previously generated native image for the application.

In addition to handling updates to libraries on the device, the device can update an application when the application has changed (e.g., MDIL code of the application has changed). In this case, the device updates the application by generating an updated native image for the application, including binding a new portion of the MDIL code with the one or more libraries (unchanged) on the device. The updated native image for the application can be generated by the binder such that the native images are runnable using the updated runtime engine.

As shown at 660, the previously generated native image can be stored temporarily during the generation of the updated native image and/or update of the computing device 600 until the update of the application and/or computing device 600 is verified as successful. If the update to the computing device and/or to the application fails, the previously generated native image can be restored from temporary storage and again used as the native image that is loaded by the computing device to execute the application.

Figure 7:
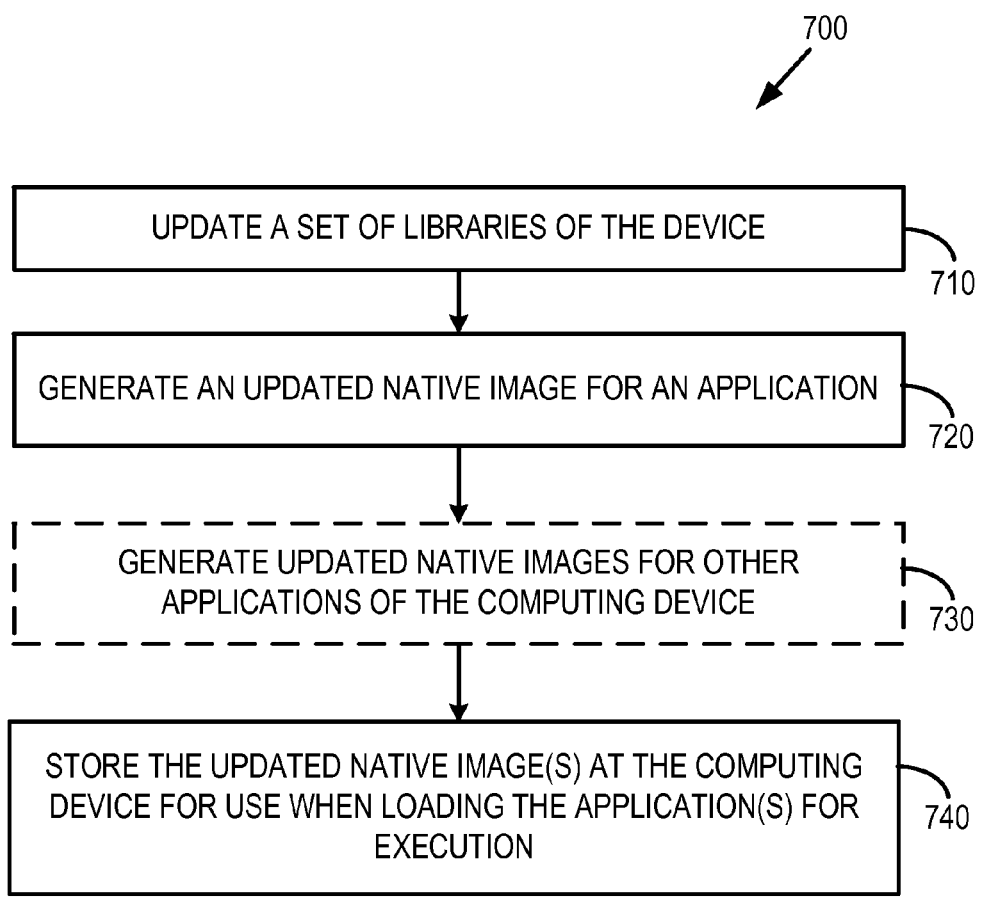
FIG. 7 is a flow diagram of an exemplary method for updating an application by generating a native image for the application from code in a MDIL.

Exemplary Method for Updating an Application Through Native Code Generation Using Code in a MDIL FIG. 7 is an exemplary method 700 for updating an application by generating a native image for the application from code in a MDIL. In various implementations, the illustrated method blocks of FIG. 7 may be merged, divided into sub-blocks, or omitted. In FIG. 7, a set of one or more libraries are updated on a computing device, as shown at 710. For example, a portion or all of the one or more libraries on the computing device are changed, modified, or otherwise updated. In some implementations, the set of one or more libraries are updated and a runtime engine of the device is updated as part of a computing device update. In some implementations, for one or more applications on the computing device, at least one of the libraries of the one or more libraries that were bound to MDIL code for the respective application (to generate a native image for the respective application during installation) has been changed, modified, or otherwise updated. In some implementations, a library is updated and/or changed such that the code of the native image for an application that is bound to the library no longer corresponds properly to at least one offset for the library. For example, an offset for at least one field of an object has changed in the library, or the like. A set of the libraries on the computing device can be updated as part of an operating system update. Or, libraries on the computing device can be updated as part of an update to a framework and/or an execution engine update. For example, the computing device can use a framework to execute managed application such as the .NET framework, and the libraries that are part of the framework are changes and/or updated and/or the runtime engine that is part of the framework is changed and/or updated. In the .NET framework, the base class libraries can be changed or updated to a different and/or newer version of the framework libraries. In some cases, not all the libraries on the computing device are updated and/or changed. In other cases, all the libraries on the computing device are updated and/or changed.

At 720, the computing device generates an updated native image for an application. For example, an application that was installed on the computing device by generating a native image from MDIL code for the application can be updated such that a new native image (e.g., an updated native image) is generated for the application by binding the MDIL code for the application to one or more libraries after at least one of the one or more libraries has been updated on the computing device. The generating of the updated native image can be similar to the generation of the native image when the application was originally installed. For example, the updated native image can be generated for the application using at least one of the updated libraries of the computing device as described above for the installation process. Thus, the generating of an updated native image occurs after a first native image for the application has already been generated for the application and one or more of the libraries bound during the generation of the first native image have been updated and/or changed on the computing device. In some implementations, when the runtime engine has been updated along with libraries of the computing device, the binding of the MDIL code of the application being updated can be done such that the generated native image is executable using the updated runtime engine and the updated libraries as available on the computing device.

Or, an updated native image can be generated when MDIL code for the application is updated but libraries and/or runtime engines have not changed. For example, the computing device receives new MDIL code for the application as part of an application update. The received new MDIL code for the application can be installed as described herein such as using the method 200 above. For example, the computing device updates the application by generating an updated native image for the application, including binding a portion of the new MDIL code with the one or more libraries (unchanged) on the computing device. The native code generated for the application by a binder can be generated such that it is runnable using the runtime engine available on the device for running the application.

In some implementations, for the application being updated, the MDIL code for the application stored on the computing device for the application can be bound to one or more libraries of the device. For example, a binder can bind the MDIL code to one or more libraries available on the computing device to generate an executable native image that is updated for the application. The binding resolves the MDIL code and generates native code for the application that is included in the updated native image for the application. In some implementations, in generating the updated native image, for each MDIL file in the set of MDIL files for the application, the respective MDIL file and the one or more libraries that are to be bound to the MDIL code of the file are provided to the binder. The binder binds the respective MDIL files to the libraries provided to the binder to generate the updated native image for the application. The updated native image can include native code, such as machine code that is executable by the processor of the computing device, and the updated native image typically does not include unbound pseudo instructions as in the MDIL code. In some implementations, the generated updated native images can be signed as trusted code.

In some implementations, the updated native image replaces the previously generated native image for the application as the native image that is loaded for executing the application. The updated native image is loaded to execute the application because the updated native image includes native code that is executable using the at least one of the updated libraries of the computing device. The previously generated native image may be unstable and/or unreliable, such that it does not function properly or as expected, because it can improperly reference an earlier version of one of the libraries available on the computing device.

In some implementations, when an updated native image is being generated, the previously generated native image is stored and/or backed up temporarily until the application and/or update to the computing device is verified as successful. For example, an update to the computing device that updates libraries of the computing device can trigger the regeneration and/or updating of native images for applications. If the update to the computing device or the update of a native image for an application fails, the failed update can be rolled back and the previously generated native image of the application that is stored can be used as the native image of the application when executed. In some implementations, application data is also preserved. For example, a user of the application can generate user data and/or application data before the application is updated, and, after the application is updated, the user data and/or application data can be preserved such that the generation of the updated native image does not change the user data and/or application data from the previous version of the application.

At 730, the computing device generates an updated native image for one or more other applications installed on the device. For example, for each additional application installed on the computing device that has a native image that was generated by binding MDIL code to one or more of the libraries that were updated, an updated native image for the respective application is generated by binding the MDIL code to the one or more libraries as updated. The dotted lines, as shown at 730, indicate that the block 730 can be omitted from the method or included in the method in various implementations of the method 700. In some implementations, after one or more libraries of a device are updated (such as in a framework update), the applications of the device can be automatically updated, and updated native images for the applications can be generated, so that the applications execute properly using the updated libraries. If an installed application does not use shared libraries that have been updated and/or changed, the application need not be updated, and an updated native image need not be generated for the application, as the previously generated native image for the application can function properly with the libraries as available on the device. In some implementations, when a runtime engine has been updated along with the libraries of the computing device, the updated native images for the applications can be generated such that the application is executable on the computing device using the updated runtime engine and the updated libraries as available on the computing device.

At 740, the updated native image is stored for use when loading the application to execute the application at the computing device. For example, the updated native image is loaded instead of a native image of the application generated previous to the generation of the updated native image. The updated native image is loaded to execute the application because the updated native image can properly reference the libraries it uses. By generating updated native images by rebinding already downloaded MDIL code for an application, a computing device that uses native images to run applications can be updated without having to download an updated version of the application, without re-installing the application from newly downloaded information for the application, and without re-compiling the application.

Exemplary Mobile Device

Figure 8:
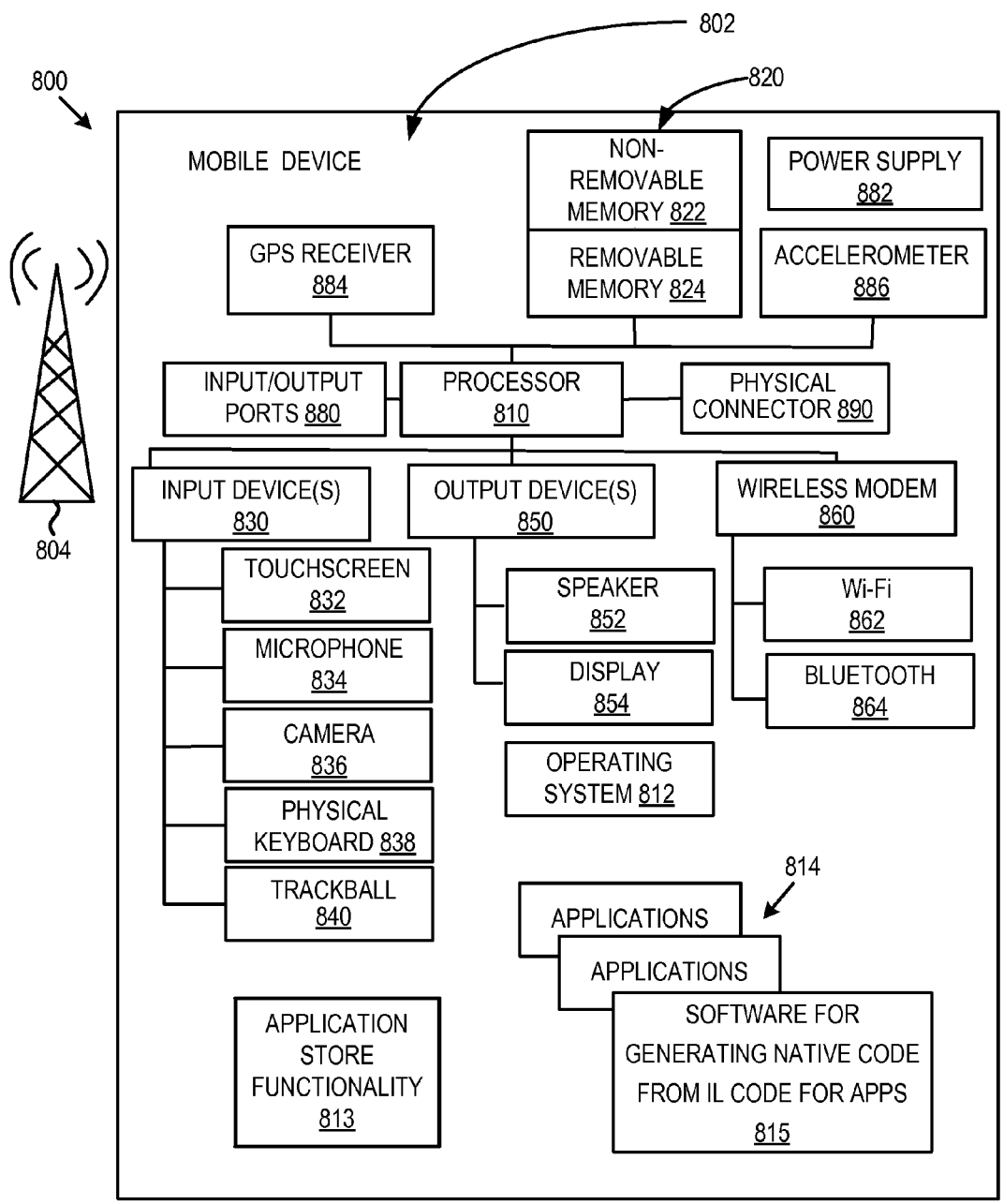
FIG. 8 is a schematic diagram depicting an exemplary mobile device with which at least some of the disclosed embodiments can be implemented.

FIG. 8 is a system diagram depicting an exemplary mobile device 800 including a variety of optional hardware and software components, shown generally at 802. In general, a component 802 in the mobile device can communicate with another component, although not all connections are shown, for ease of illustration. The mobile device can be any of a variety of computing devices (e.g., cell phone, smartphone, tablet computer, handheld computer, Personal Digital Assistant (PDA), etc.) and can allow wireless two-way communications with one or more mobile communications networks 804, such as a cellular or satellite network.

The illustrated mobile device 800 can include a controller or processor 810 (e.g., signal processor, microprocessor, ASIC, or other control and processing logic circuitry) for performing such tasks as signal coding, data processing, input/output processing, power control, and/or other functions. An operating system 812 can control the allocation and usage of the components 802 and support for one or more application programs 814 and/or one or more software programs 815 such as one that can implement one or more of the technologies described herein for generating native code from IL code on a device for applications. The application programs can include common mobile computing applications and software (e.g., email applications, calendars, contact managers, web browsers, messaging applications, a runtime engine), or any other computing applications. Functionality 813 for accessing an application store, an online marketplace, or online provider can also be used for acquiring and updating code and/or other information for application programs 814.

The illustrated mobile device 800 can include memory 820. Memory 820 can include non-removable memory 822 and/or removable memory 824. The non-removable memory 822 can include RAM, ROM, flash memory, a hard disk, or other well-known memory storage technologies. The removable memory 824 can include flash memory or a Subscriber Identity Module (SIM) card, which is well known in GSM communication systems, or other well-known memory storage technologies, such as "smart cards." The memory 820 can be used for storing data and/or code for running the operating system 812 and the applications 814 and 815. Example data can include web pages, text, images, sound files, video data, or other data sets to be sent to and/or received from one or more network servers or other devices via one or more wired or wireless networks. The memory 820 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 800 can support one or more input devices 830, such as a touchscreen 832, microphone 834, camera 836, physical keyboard 838 and/or trackball 840 and one or more output devices 850, such as a speaker 852 and a display 854. Other possible output devices (not shown) can include piezoelectric or other haptic output devices. Some devices can serve more than one input/output function. For example, touchscreen 832 and display 854 can be combined in a single input/output device. The input devices 830 can include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (EEG and related methods). Thus, in one specific example, the operating system 812 or applications 814 can comprise speech-recognition software as part of a voice user interface that allows a user to operate the device 800 via voice commands. Further, the device 800 can comprise input devices and software that allows for user interaction via a user's spatial gestures, such as detecting and interpreting gestures to provide input to a gaming application or other application.

A wireless modem 860 can be coupled to an antenna (not shown) and can support two-way communications between the processor 810 and external devices, as is well understood in the art. The modem 860 is shown generically and can include a cellular modem for communicating with the mobile communication network 804 and/or other radio-based modems (e.g., Bluetooth 864 or Wi-Fi 862). The wireless modem 860 is typically configured for communication with one or more cellular networks, such as a GSM network for data and voice communications within a single cellular network, between cellular networks, or between the mobile device and a public switched telephone network (PSTN).

The mobile device can further include at least one input/output port 880, a power supply 882, a satellite navigation system receiver 884, such as a Global Positioning System (GPS) receiver, an accelerometer 886, and/or a physical connector 890, which can be a USB port, IEEE 1394 (FireWire) port, and/or RS-232 port. The illustrated components 802 are not required or all-inclusive, as any components can deleted and other components can be added.

Exemplary Implementation Environment

Figure 9:
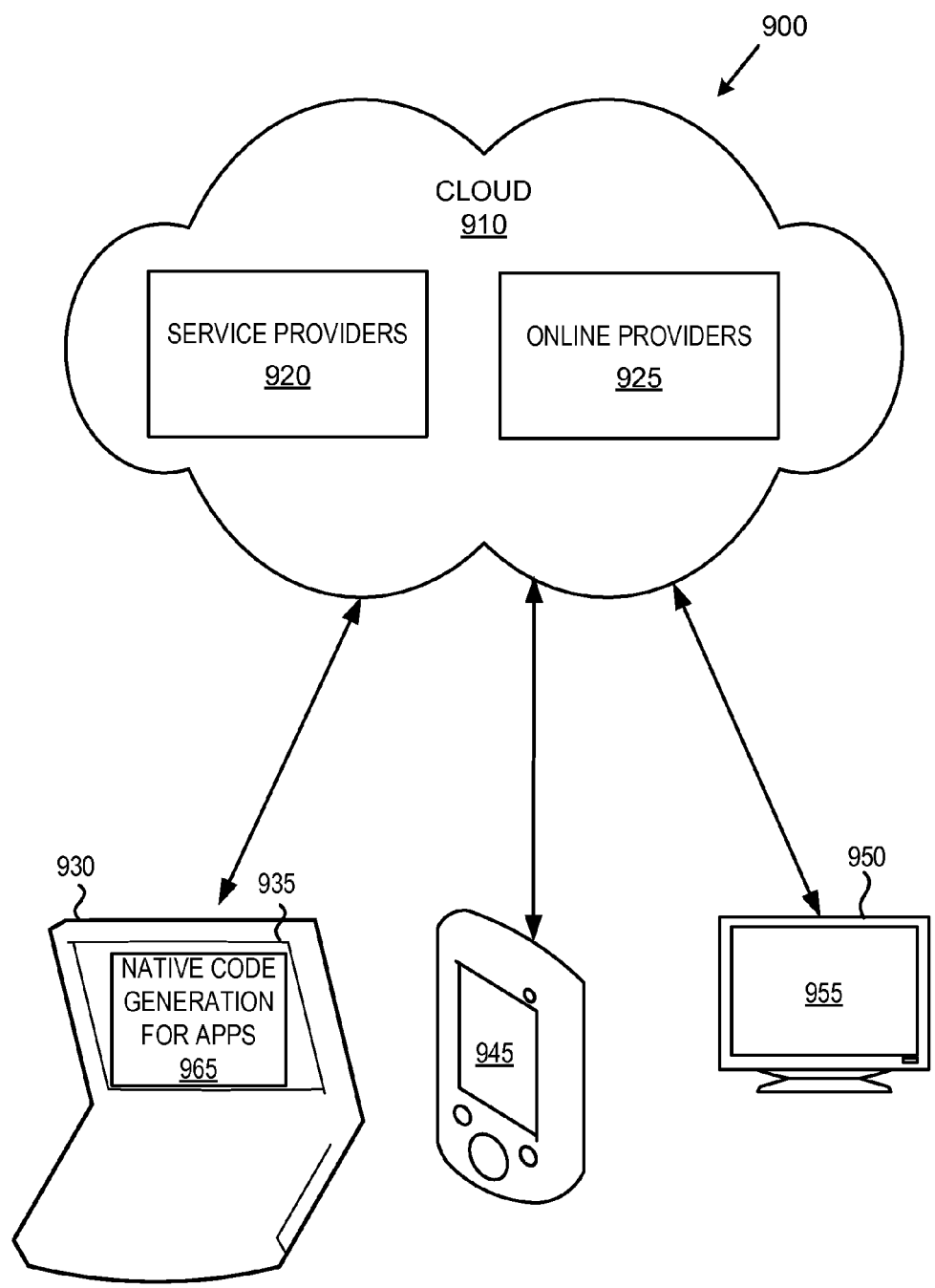
FIG. 9 is a schematic diagram illustrating a generalized example of a suitable implementation environment for at least some of the disclosed embodiments.

FIG. 9 illustrates a generalized example of a suitable implementation environment 900 in which described embodiments, techniques, and technologies may be implemented.

In example environment 900, various types of services (e.g., computing services) are provided by a cloud 910. For example, the cloud 910 can comprise a collection of computing devices, which may be located centrally or distributed, that provide cloud-based services to various types of users and devices connected via a network such as the Internet. The implementation environment 900 can be used in different ways to accomplish computing tasks. For example, some tasks (e.g., processing user input and presenting a user interface) can be performed on local computing devices (e.g., connected devices 930, 940, 950) while other tasks (e.g., storage of data to be used in subsequent processing) can be performed in the cloud 910.

In example environment 900, the cloud 910 provides services for connected devices 930, 940, 950 with a variety of screen capabilities. Connected device 930 represents a device with a computer screen 935 (e.g., a mid-size screen). For example, connected device 930 could be a personal computer such as desktop computer, laptop, notebook, netbook, or the like. Connected device 940 represents a device with a mobile device screen 945 (e.g., a small size screen). For example, connected device 940 could be a mobile phone, smart phone, personal digital assistant, tablet computer, or the like. Connected device 950 represents a device with a large screen 955. For example, connected device 950 could be a television screen (e.g., a smart television) or another device connected to a television (e.g., a set-top box or gaming console) or the like. One or more of the connected devices 930, 940, and 950 can include touchscreen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 900. For example, the cloud 910 can provide services for one or more computers (e.g., server computers) without displays.

Services can be provided by the cloud 910 through service providers 920, or through other providers of online services (not depicted). For example, cloud services can be customized to the screen size, display capability, and/or touchscreen capability of a particular connected device (e.g., connected devices 930, 940, 950).

In example environment 900, the cloud 910 provides the technologies and solutions described herein to the various connected devices 930, 940, 950 using, at least in part, the service providers 920 and the one or more online providers 925. For example, the service providers 920 can provide a centralized solution for various cloud-based services. The service providers 920 can manage service subscriptions for users and/or devices (e.g., for the connected devices 930, 940, 950 and/or their respective users). The cloud 910 can provide resources for downloading, sending, or receiving one or more one installation packages for one or more applications as discussed herein. For example, intermediate language code for an application can be compiled in the cloud 910 by at least one of the online providers 925. As shown at 965, a native image is generated for an application by connected device 930 from IL code downloaded from the cloud 910.

Exemplary Computing Environment

Figure 10:
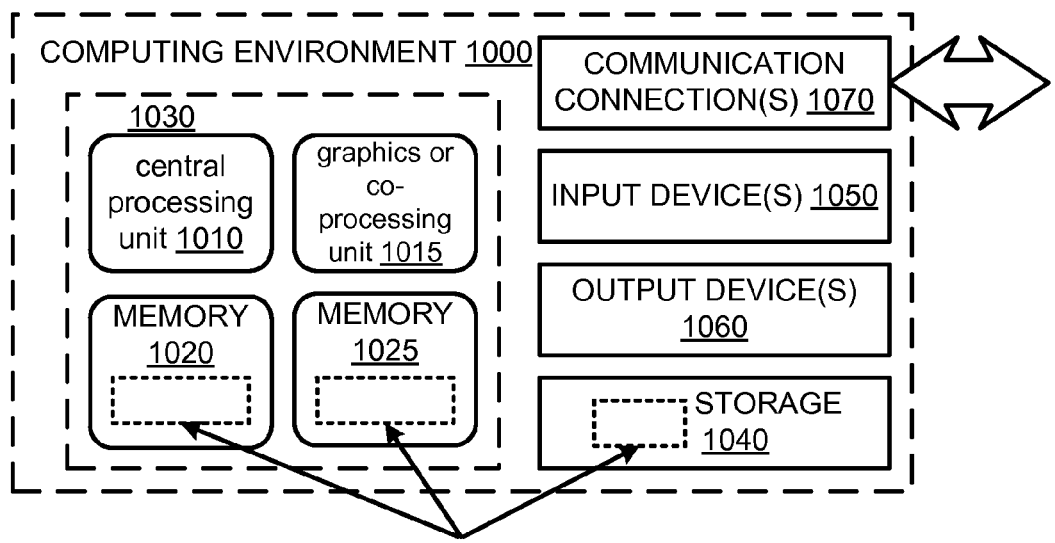
FIG. 10 is a schematic diagram illustrating a generalized example of a suitable computing environment for at least some of the disclosed embodiments.

FIG. 10 depicts a generalized example of a suitable computing environment 1000 in which the described innovations may be implemented. The computing environment 1000 is not intended to suggest any limitation as to scope of use or functionality, as the innovations may be implemented in diverse general-purpose or special-purpose computing systems. For example, the computing environment 1000 can be any of a variety of computing devices (e.g., desktop computer, laptop computer, server computer, tablet computer, media player, gaming system, mobile device, etc.)

With reference to FIG. 10, the computing environment 1000 includes one or more processing units 1010, 1015 and memory 1020, 1025. In FIG. 10, this basic configuration 1030 is included within a dashed line. The processing units 1010, 1015 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 10 shows a central processing unit 1010 as well as a graphics processing unit or co-processing unit 1015. The tangible memory 1020, 1025 may be volatile memory (e.g., registers, cache, RAM), nonvolatile memory (e.g., ROM, EEPROM, flash memory, etc.), or some combination of the two, accessible by the processing unit(s). The memory 1020, 1025 stores software 1080 implementing one or more innovations described herein, in the form of computer-executable instructions suitable for execution by the processing unit(s).

A computing system may have additional features. For example, the computing environment 1000 includes storage 1040, one or more input devices 1050, one or more output devices 1060, and one or more communication connections 1070. An interconnection mechanism (not shown) such as a bus, controller, or network interconnects the components of the computing environment 1000. Typically, operating system software (not shown) provides an operating environment for other software executing in the computing environment 1000, and coordinates activities of the components of the computing environment 1000.

The tangible storage 1040 may be removable or non-removable, and includes magnetic disks, magnetic tapes or cassettes, CD-ROMs, DVDs, or any other medium which can be used to store information in a non-transitory way and which can be accessed within the computing environment 1000. The storage 1040 stores instructions for the software 1080 implementing one or more innovations described herein such as generating native code from IL code for one or more applications.

The input device(s) 1050 may be a touch input device such as a keyboard, mouse, pen, or trackball, a voice input device, a scanning device, or another device that provides input to the computing environment 1000. For video encoding, the input device(s) 1050 may be a camera, video card, TV tuner card, or similar device that accepts video input in analog or digital form, or a CD-ROM or CD-RW that reads video samples into the computing environment 1000. The output device(s) 1060 may be a display, printer, speaker, CD-writer, or another device that provides output from the computing environment 1000.

The communication connection(s) 1070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as flash memory or hard drives)) and executed on a computer (e.g., any commercially available computer, including smart phones or other mobile devices that include computing hardware). As should be readily understood, the term computer-readable storage media does not include communication connections, such as modulated data signals. Any of the computer-executable instructions for implementing the disclosed techniques as well as any data created and used during implementation of the disclosed embodiments can be stored on one or more computer-readable media (e.g., non-transitory computer-readable media, which excludes propagated signals). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, C#, J++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

It should also be well understood that any functionally described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims and their equivalents.

We claim:

1. A method comprising:
   receiving, at a computing device, at least one device-type-specific installation package for an application from an online provider, the at least one device-type-specific installation package comprising a file with non-executable machine dependent intermediate language (MDIL) code generated by the online provider for the application, one or more resource files that can be used by the application when it is executed, a listing of files that indicates at least one of a set of MDIL files included in the at least one device-type-specific installation package, and a listing of one or more libraries that are to be bound to the code of respective indicated MDIL files,
wherein the non-executable MDIL code was previously compiled remotely from the computing device and transmitted by the online provider, and wherein the non-executable MDIL code includes machine-dependent instructions and pseudo instructions with unresolved symbolic references to be resolved into native code during installation of the application, the machine-dependent instructions being based on a processor instruction set for a processor;
wherein the at least one device-type-specific installation package was previously stored remotely from the computing device, along with a variety of other device-type-specific installation packages, at an online marketplace;
at the computing device, installing the application on the computing device by generating a native image for the application by binding the non-executable MDIL code, the generating the native image comprising:
    binding a portion of the non-executable MDIL code with the one or more libraries on the computing device, including resolving the unresolved symbolic references in the pseudo instructions to generate corresponding native instructions for the native image; and
    storing the native image on the computing device for use when loading the application for execution;
updating a set of libraries on the computing device, the set of libraries including at least one library of the one or more libraries bound to the portion of the non-executable MDIL code;
after the updating of the set of libraries on the computing device, generating an updated native image for the application by binding the portion of the non-executable MDIL code with the at least one library of the one or more libraries, wherein the binding avoids re-compilation on the computing device for the application in response to the updating of the set of libraries.

2. The method of claim 1 further comprising:
updating at least one runtime engine of the computing device, the updated native image for the application being generated such that the updated native image is runnable using the updated at least one runtime engine; and
storing the updated native image on the computing device for use when loading the application for execution.

3. The method of claim 1, wherein the application is a first application and the computing device includes a native image for a second application installed on the computing device, and wherein the method further comprises:
responsive to the updating of the set of libraries, generating an updated native image for the second application using one or more files included received in an installation package for the second application before the first application was installed on the computing device.

4. The method of claim 2 further comprising:
temporarily preserving the native image of the application;
determining that the updating of the set of libraries or the at least one runtime engine failed; and
restoring the native image of the application for use when loading the application.

5. The method of claim 1, wherein the non-executable MDIL code is generated by the online provider by compiling preliminary code, and wherein the preliminary code comprises source code or code of the application in an intermediate language that does not include any machine-dependent instructions.

6. The method of claim 1 further comprising, determining that the at least one device-type-specific installation package is signed by the online provider to indicate the at least one device-type-specific installation package is trusted as having been generated by the online provider.

7. The method of claim 1, wherein a binding list associates the listing of files with the listing of one or more libraries, and the method further comprises:
    with a package manager, evaluating the binding list;
    invoking a binder to perform the binding; and
    based on the evaluation of the binding list, providing the binding list to the binder to identify the one or more libraries for binding to the respective indicated MDIL files in the listing of files.

8. The method of claim 1, further comprising loading the native image during execution of the application, wherein the loading of the native image is performed by a common language runtime.

9. The method of claim 1, wherein the machine-dependent instructions include one or more of machine code instructions and assembly instructions.

10. The method of claim 1, wherein the binding the portion of the non-executable MDIL code with the one or more libraries comprises:
    generating a native language instruction from a given pseudo instruction of the pseudo instructions in the portion of the non-executable MDIL code.

11. The method of claim 10 wherein the generating a native language instruction comprises generating a numeric field offset based on the given pseudo instruction.

12. The method of claim 11, wherein the given pseudo instruction includes a token that identifies a field and the native language instruction includes the numeric field offset to reference the field when executed.

13. The method of claim 9, further comprising:
    receiving new non-executable MDIL code for the application;
    updating the application on the computing device by generating a second updated native image for the application, including binding a new portion of the new non-executable MDIL code with the one or more libraries on the computing device; and
    storing the second updated native image on the computing device for use when loading the application for execution.

14. A computing device that includes a processor and memory, the memory storing computer-executable instructions for causing the computing device to perform operations comprising:
    receiving, at the computing device, at least one device-type-specific installation package for an application from an online provider, the at least one device-type-specific installation package comprising a set of non-executable machine dependent intermediate language (MDIL) files that contain non-executable MDIL code, one or more resource files that can be used by the application when it is executed, a listing of files that indicates at least one of the set of MDIL files included in the at least one device-type-specific installation package, and a listing of one or more libraries that are to be bound to the code of respective indicated MDIL files, the non-executable MDIL code having been previously compiled remotely from the computing device and including machine-dependent instructions and pseudo instructions with unresolved symbolic references to be resolved into native code during installation of the application, the machine-dependent instructions being based on a processor instruction set for the processor;

the at least one device-type-specific installation package having been previously stored remotely from the computing device, along with a variety of other device-type-specific installation packages specific to device types other than a device type of the computing device, at an online marketplace;

the one or more resource files comprising one or more of sound information, music information, graphics information, video information, other media information, database information, and text information;

evaluating the listing of files;

based on the evaluation of the listing of files, providing, to a binder of the computing device, at least one non-executable MDIL file of the set of non-executable MDIL files and the one or more libraries to be bound to the at least one non-executable MDIL file; and with the binder, generating a native image for the application during installation of the application, the generating comprising binding non-executable MDIL code of the at least one non-executable MDIL file using the one or more libraries, including resolving the unresolved symbolic references in the pseudo instructions to generate corresponding native instructions for the native image;

updating a set of libraries on the computing device, the set of libraries including at least one library of the one or more libraries bound to the non-executable MDIL code;

after the updating of the set of libraries on the computing device, generating an updated native image for the application by binding the non-executable MDIL code with the at least one library of the one or more libraries;

wherein use of the binder avoids re-compilation on the computing device for the application when the one or more libraries are changed and/or when a runtime engine is changed.

15. The computing device of claim 14, wherein the set of non-executable MDIL files are generated by the online provider at least by compiling preliminary code of the application to generate the set of non-executable MDIL files, before the at least one device-type-specific installation package is received at the computing device.

16. The computing device of claim 14, wherein the respective indicated MDIL files of the set of non-executable MDIL files are signed at the online marketplace to indicate the respective indicated MDIL files have been generated at the online marketplace before the at least one device-type-specific installation package is received.

17. One or more computer-readable media memory storing computer-executable instructions for causing a computing device programmed thereby to perform operations comprising:

receiving, at the computing device, at least one device-type-specific installation package for an application from an online provider, the at least one device-type-specific installation package comprising a file with non-executable machine dependent intermediate language (MDIL) code generated by the online provider for the application, one or more resource files that can be used by the application when it is executed, a listing of files that indicates at least one of a set of MDIL files included in the at least one device-type-specific installation package, and a listing of one or more libraries that are to be bound to the code of respective indicated MDIL files, wherein the non-executable MDIL code was previously compiled remotely from the computing device and transmitted by the online provider, and wherein the non-executable MDIL code includes machine-dependent instructions and pseudo instructions with unresolved symbolic references to be resolved into native code during installation of the application, the machine-dependent instructions being based on a processor instruction set for a processor;

wherein the at least one device-type-specific installation package was previously stored remotely from the computing device, along with a variety of other device-type-specific installation packages, at an online marketplace;

at the computing device, installing the application on the computing device by generating a native image for the application by binding the non-executable MDIL code, the generating the native image comprising:

binding a portion of the non-executable MDIL code with the one or more libraries on the computing device, including resolving the unresolved symbolic references in the pseudo instructions to generate corresponding native instructions for the native image; and storing the native image on the computing device for use when loading the application for execution;

updating a set of libraries on the computing device, the set of libraries including at least one library of the one or more libraries bound to the portion of the non-executable MDIL code;

after the updating of the set of libraries on the computing device, generating an updated native image for the application by binding the portion of the non-executable MDIL code with the at least one library of the one or more libraries, wherein the binding avoids re-compilation on the computing device for the application in response to the updating of the set of libraries.

18. The one or more computer-readable media memory of claim 17, further storing computer-executable instructions for causing the computing system programmed thereby to perform operations comprising:

updating at least one runtime engine of the computing device, the updated native image for the application being generated such that the updated native image is runnable using the updated at least one runtime engine; and storing the updated native image on the computing device for use when loading the application for execution.

19. The one or more computer-readable media memory of claim 17, further storing computer-executable instructions for causing the computing system programmed thereby to perform operations comprising:

responsive to the updating of the set of libraries, generating an updated native image for the second application using one or more files included received in an installation package for the second application before the first application was installed on the computing device.

20. The one or more computer-readable media memory of claim 17, further storing computer-executable instructions for causing the computing system programmed thereby to perform operations comprising:

temporarily preserving the native image of the application;

determining that the updating of the set of libraries or the at least one runtime engine failed; and restoring the native image of the application for use when loading the application.

* * * * *